United States Patent
Malhotra et al.

(10) Patent No.: US 10,990,456 B2
(45) Date of Patent: *Apr. 27, 2021

(54) METHODS AND SYSTEMS FOR FACILITATING APPLICATION PROGRAMMING INTERFACE COMMUNICATIONS

(71) Applicant: Rovi Guides, Inc., San Jose, CA (US)

(72) Inventors: Manik Malhotra, Durham, NC (US); Jon Wayne Heim, Chapel Hill, NC (US); Thomas Page Odom, Cary, NC (US)

(73) Assignee: ROVI GUIDE, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,719

(22) Filed: Jun. 4, 2019

(65) Prior Publication Data
US 2020/0387414 A1    Dec. 10, 2020

(51) Int. Cl.
    *G06F 9/54*     (2006.01)
    *G06F 3/0484*   (2013.01)
    *G06F 9/451*    (2018.01)

(52) U.S. Cl.
    CPC .......... *G06F 9/543* (2013.01); *G06F 3/0484* (2013.01); *G06F 9/451* (2018.02)

(58) Field of Classification Search
    CPC ...................................... G06F 9/543

USPC ......................................... 719/328
See application file for complete search history.

(56) References Cited

U.S. PATENT DOCUMENTS

| | | | |
|---|---|---|---|
| 8,171,412 B2 | 5/2012 | Sand et al. | |
| 9,684,826 B2 | 6/2017 | Dubuque | |
| 9,762,851 B1 | 9/2017 | Baumert et al. | |
| 9,916,864 B2 | 3/2018 | An | |
| 10,347,296 B2 | 7/2019 | An | |
| 10,796,690 B2 | 10/2020 | Ganz et al. | |
| 2012/0254810 A1 | 10/2012 | Heck et al. | |
| 2016/0259775 A1 | 9/2016 | Gelfenbeyn et al. | |
| 2017/0031652 A1 | 2/2017 | Kam et al. | |
| 2018/0204602 A1 | 7/2018 | An | |
| 2018/0336009 A1 | 11/2018 | Yoganandan et al. | |
| 2019/0073401 A1 | 3/2019 | Gupta et al. | |
| 2019/0121612 A1 | 4/2019 | Ashoori et al. | |
| 2020/0066261 A1 | 2/2020 | Ganz et al. | |
| 2020/0387413 A1 | 12/2020 | Malhotra et al. | |

OTHER PUBLICATIONS

U.S. Appl. No. 16/430,711, filed Jun. 4, 2019, Manik Malhotra.
PCT International Search Report for International Application No. PCT/US2020/035191, dated Sep. 28, 2020 (14 pages).

*Primary Examiner* — Timothy A Mudrick
(74) *Attorney, Agent, or Firm* — Haley Guiliano LLP

(57) ABSTRACT

Method and systems for facilitating communications using application programming interfaces ("APIs") by interpreting a received command based on the command and an image of the user interface that was displayed on a display screen when the command was received.

20 Claims, 9 Drawing Sheets

900

```
url = 'http://file.api.VoiceRecognitionApplication.com/cgi-     ╱─902
bin/media/upload?access_token=%s&type=image'%access_token
file1 = {
'file': (filename, open(filepath, 'rb'),
'Content-Type': 'image/jpeg',           ─904
'Content-Length': l
}
file2 = {
'file': (filename, open(filepath, 'rb'),
'Content-Type': 'audio/mp3',            ─906
'Content-Length': l
}
r = requests.post(url, files=file1, file2)
                                            ─908
```

FIG. 9

METHODS AND SYSTEMS FOR FACILITATING APPLICATION PROGRAMMING INTERFACE COMMUNICATIONS

BACKGROUND

Viewers are consuming content in a plurality of ways and from a plurality of devices. Each of these devices and each of these forms of consumption comes with unique features and requirements for interacting with the content.

SUMMARY

To enable these features and requirements on devices, the present systems and methods relate to facilitating application programming interface ("API") communications between devices and/or applications on the same device. Through the use of improved API communications, a first party (e.g., content provider) may provide devices that use a third party's (e.g., a voice search software provider) application. For example, using a Search/Recommendation & Voice Search application provided by a third party, a first party's device may provide voice search features.

Unfortunately, dependence on third-party applications, particularly advance features such as voice recognition and natural language processing, creates complications with integrating existing functionality on a first party's device with these features because most third-party applications include their own API with the application, and it may not be practical to modify their logic to a specific device's functionality.

These complications cause information to be lost (or never transmitted) during communications between applications, which results in poor performance or the loss of certain features. To overcome this problem, the system and method disclosed herein supplement API requests with unconventional information to mitigate the potential for poor performance or the loss of certain features. For example, API calls for a Search/Recommendation & Voice Search application would conventionally include only a specific input (e.g., an audio sample of the voice command received from a user) because the voice recognition application's function is conventionally to interpret the audio data. In another example, API calls for Natural Language Processing applications would conventionally include only a specific input (e.g., a text string of a command received from a user) because the Natural Language Processing function is conventionally to interpret the text string.

By supplementing these API calls with additional unconventional data (e.g., information on the context of a current user interface), the limitations discussed above can be overcome. For example, the UI context at the time of API call, even at a basic level, provides useful data (e.g., what screen is currently displayed on the device, the name of the content currently being played, whether the closed captions are enabled or not, etc.) for interpreting ambiguous commands, identifying user intent, etc. or otherwise mitigating the potential for poor performance or the loss of certain features.

In an aspect, methods and systems are disclosed herein for facilitating communications using application programming interfaces. A device may generate for display, by control circuitry, a user interface on a display screen. While the user interface is displayed, the device may receive, by the control circuitry, a command (e.g., vocal search command). In response to receiving the command, the device may capture, by the control circuitry, an image of the user interface. The device may then generate an application programming interface ("API") request for interpreting the command (e.g., an API request for a voice recognition application), wherein the API request includes the image. The device may receive, by the control circuitry, an API response to the API request, wherein the API response is customized based on the image.

In another aspect, methods and systems are disclosed herein for facilitating communications using application programming interfaces. A device may receive, by control circuitry, an API request for interpreting a command, wherein the API request includes an image of a user interface as displayed on a display screen when the command was received. The device may determine, by the control circuitry, a command response based on the command and the image. The device may generate an API response based on the command response. The device may then transmit the API response.

It should be noted, the systems, methods, apparatuses, and/or aspects described above may be applied to, or used in accordance with, other systems, methods, apparatuses, and/ or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 is an illustrative example of a supplemented API call in accordance with some embodiments of the disclosure.

DETAILED DESCRIPTION OF DRAWINGS

Methods and systems are disclosed herein for facilitating communications using application programming interfaces ("APIs"). In some embodiments, such as the embodiment shown in FIG. 1, one or more devices may generate for display a user interface on a display screen. For example, as shown in FIG. 1, a display screen is currently displaying user interface 100 with four objects (i.e., objects 102, 104, 106, and 108) corresponding to different types of content.

It should be noted that the objects described below are exemplary only. As referred to herein, an "object" may include any portion of content and/or user interface that has electronically or manually distinguishable boundaries. For example, an object may correspond to a detectable class of items (e.g., an alphanumeric character, face of a person, etc.). The object may be detectable by metadata or other tags in content or may be detected through the use of machine learning approaches such as edge orientation histograms, scale-invariant feature transform descriptors, vectors, etc. It should be further noted that the embodiments described herein are not limited by the type of content and/or user interface.

Figure 1:
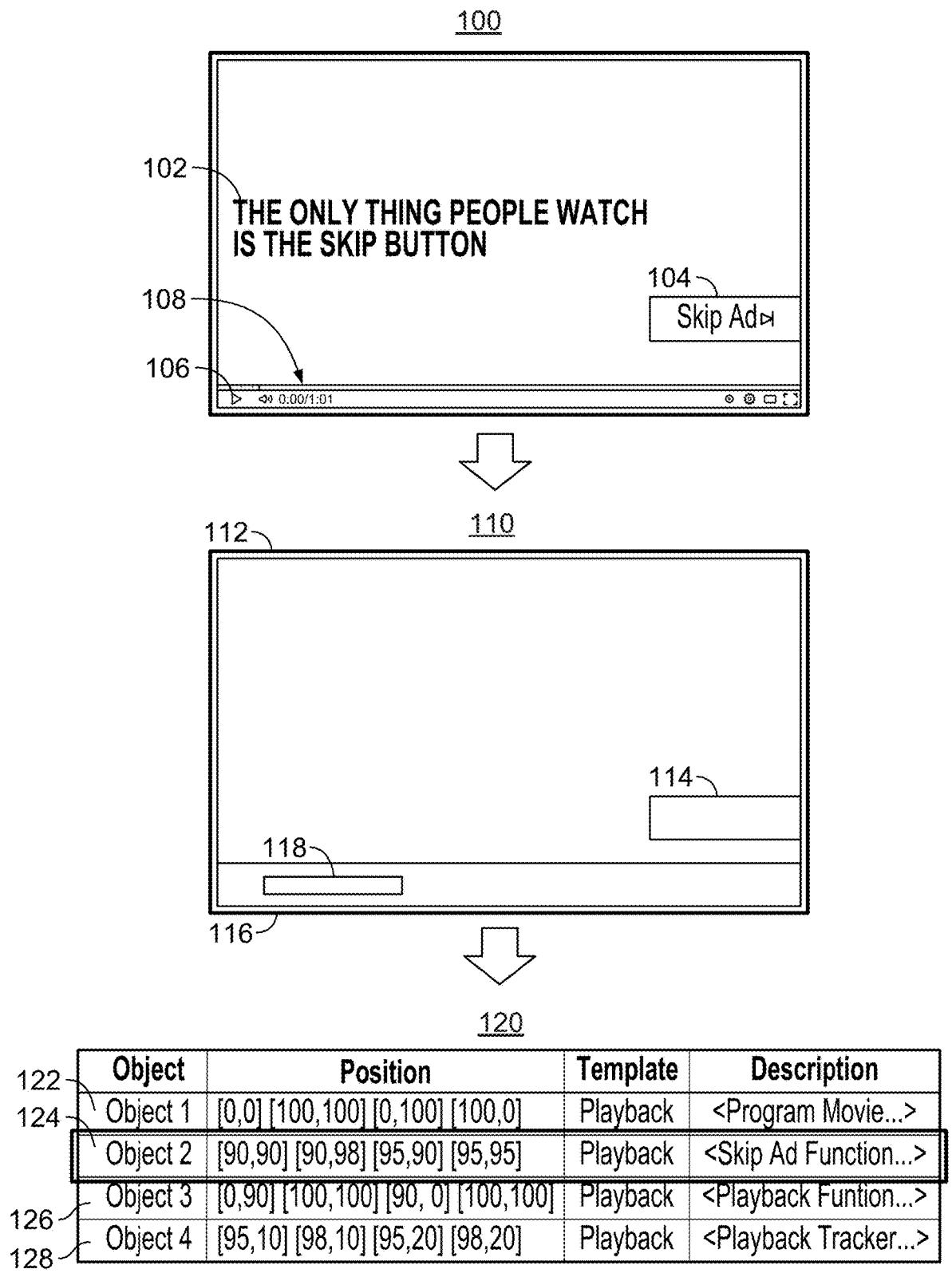
FIG. 1 shows an illustrative embodiment of determining a context of a user interface and supplementing an API request in accordance with some embodiments of the disclosure.

For example, in FIG. 1, object 102 includes content (e.g., an advertisement) that is currently being displayed. Object 102 includes audio, video and textual data. The textual data (i.e., "The only thing people watch is the skip button") may appear as textual information within the content or may include metadata (e.g., subtitles, program descriptions, etc.). As referred to herein, the terms "asset" and/or "content" should be understood to mean an electronically consumable user asset, such as television programming, as well as pay-per-view programs, on-demand programs (as in video-on-demand (VOD) systems), IP TV, Internet content (e.g., streaming content, downloadable content, Webcasts, etc.), live video (e.g. FaceBook Live or Twitch), video (e.g. YouTube), user generated content, digital first, video clips, audio, music, podcasts, content information, CCV and other camera feeds, pictures, rotating images, memes, animated gifs, documents, playlists, websites, articles, books, electronic books, blogs, advertisements, chat sessions, social media, applications, games, multiplayer online games, projections, augmented reality, virtual reality, mixed reality, posts, filters, snaps, tweets, selfies, SMS texts, MMS texts, notifications, in-App messaging, personal assistant output (e.g. Amazon Show), and/or any other media or multimedia and/or combination of the same.

Object 104 corresponds to an on-screen function (e.g., the function of skipping the currently displayed advertisement). As explained below, some on-screen functions may correspond to user interface templates. That is, objects may appear with predetermined positions in a user interface template and may correspond to a preset function. It should be noted that the user interfaces referred to herein may include interfaces provided by any applications that allow users to navigate among and locate content.

Object 106 corresponds to a playback tracker bar. The playback tracker bar may, within its boundaries, feature multiple other objects. For example, object 108 is within the boundaries of object 106. Object 108 corresponds to a playback timer, which describes the current point of playback of the content. The functions and operations provided by the illustrative objects are not meant to be limiting. It should be noted that these objects may relate to any operation such as the modification, selection, and/or navigation of data related to content, such as libraries, playlists, listings, titles, descriptions, ratings information (e.g., parental control ratings, critic ratings, etc.), genre or category information, actor information, logo data (for broadcasters' or providers' logos, etc.), content format (e.g., standard definition, high definition, 3D, 360 video, etc.), advertisement information (e.g., text, images, video clips, etc.).

Functions and operations may also include playing content or executing a "fast-access playback operation," which should be understood to mean any operation that pertains to pausing or playing back a non-linear asset faster than normal playback speed or in a different order than the asset is designed to be played, such as a fast-forward, rewind, skip, chapter selection, segment selection, skip segment, jump segment, next segment, previous segment, skip advertisement or commercial, next chapter, previous chapter or any other operation that does not play back the asset at normal playback speed.

As shown in FIG. 1, the system has identified the object boundaries in boundary layout 110. For example, the system has identified object boundaries 112, 114, 116, and 118 for objects 102, 104, 106, and 108, respectively. This identification may occur prior to modifying the user interface in response to the command. Object boundaries 112, 114, 116, and 118 may then be used to classify each object and retrieve additional information about each object. For example, the system may input each object, object boundary, or characteristics of the object or object boundary into a lookup table database that lists potential objects, object boundaries, or object characteristics. The lookup table may then return additional characteristics for an object.

For example, the system may use the position of the object boundary 114 to determine additional characteristics of object 104. As shown in database 120, object 104 may corresponds to a particular template (e.g., a "Playback" template) and additionally is associated with a skip-ad function. The information used to populate database 120 may be retrieved in numerous ways. For example, database 120 may be populated automatically by the system (e.g., the API includes, or has access to, database 120) or the system may generate database 120 (e.g., the API analyzes metadata included in the content, user interface, etc. and compiles information about each object).

The system may use this information to determine how to interpret a received command. For example, while the receipt of a user command to "Skip Ad" may trigger a search function for content titled "Skip Ad" if the user interface (or user interface template) is currently displaying a search screen, if the system determines that an option for a "Skip Ad" function is currently displayed, the system may trigger the "Skip Ad" function. By doing so, the API response is customized based on the image by interpreting the command based on an object in the image.

Figure 2:
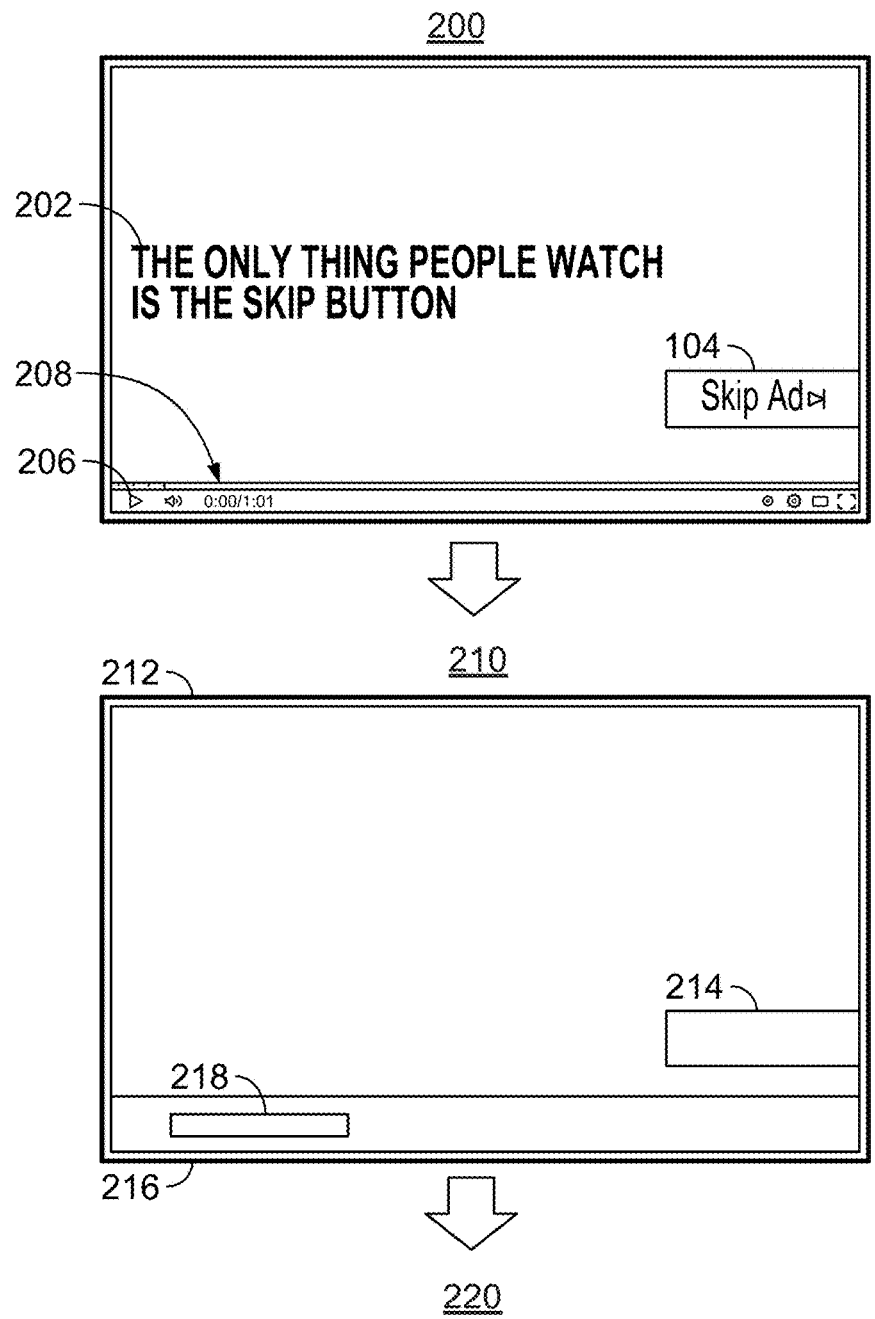
FIG. 2 shows yet another illustrative embodiment of determining a context of a user interface and supplementing an API request in accordance with some embodiments of the disclosure.

FIG. 2 shows another illustrative embodiment of determining a context of a user interface and supplementing an API request. For example, as shown in FIG. 2, a display screen is currently displaying user interface 200 with four objects (i.e., objects 202, 204, 206, and 208) corresponding to different types of content. Similar to FIG. 1, in FIG. 2, the system has identified object boundaries 212, 214, 216, and 218 for objects 202, 204, 206, and 208, respectively. Object boundaries 212, 214, 216, and 218 may then be used to classify each object and retrieve additional information about each object.

FIG. 2 also includes database 220, which includes additional or alternative information and classes of information beyond those shown in database 120 (FIG. 1). In particular, database 220 includes classes of OCR'ed text for each object (if detectable) as well as a determined context. The context may be determined based directly on the content (e.g., screenshot image) received with the API request, or the context may be determined based on a further analysis of the data in the records (e.g., records 222, 224, 226, and 228) in database 220.

While a user interface is displayed, a device may receive, by control circuitry, a command (e.g., vocal search command). In response to receiving the command, the device may capture, by the control circuitry, an image of the user interface (e.g., a screenshot of the display upon which the user interface is present). The device may then generate an application programming interface ("API") request for interpreting the command (e.g., an API request for a voice recognition application), wherein the API request includes the image (e.g., appended to, or included in, the API request as described in FIG. 9 below). The device may receive, by the control circuitry, an API response to the API request, wherein the API response is customized based on the image.

For example, the first device (e.g., a client device) may send the API request to a second device (e.g., a server). As part of this transmission the first device may supplement an API request with information that is cached on the first device (e.g., an image, metadata, or other information derived from the current state of the user interface). The second device may receive, by control circuitry, the application programming interface ("API") request for interpreting a command, wherein the API request includes an image of a user interface as displayed on a display screen when the command was received. The second device may then determine, by the control circuitry, a command response based on the command and the image. The second device may generate an API response based on the command response. The second device may then transmit the API response.

It should be noted that function and/or operations described on one device and/or being performed by one application could also be performed by the other. For example, in some embodiments, the first device may determine the object boundaries and reference database 220. The information derived from database 220 (e.g., the context of the user interface) may then be used to supplement an API request that is sent to the second device.

It should be noted that in some embodiments, the system may pull supplemental data from multiple devices (e.g., devices located in the same room, network, and/or linked to the same user profile of a user). For example, the device issuing an API request may not be the same device that is causing a user interface to be displayed. In such cases, the device issuing the API request may determine a device to which the command relates or may pull data from multiple devices and send the data from multiple devices in the API request.

For example, the system (e.g., either the device making the request or issuing the API response) may first analyze the supplemental data to determine which device the user command related to. For example, a user may issue a voice command that is received by a first device (e.g., a smart home device with voice recognition) the first device may then pull data from multiple other devices and include that data in an API request (e.g., to a server).

For example, the system may pull initial data from other devices on a network (e.g., a television, set-top box, stereo, computer, etc.) to determine what device the command related to. This initial data pull may involve detecting which devices are powered on or off (e.g., powered off devices may be excluded from further analysis), whether or not a device was currently in use (e.g., only currently in use devices may be selected), and/or other filter steps. The system may then analyze data about the remaining devices to select a given device from which to pull more data (if necessary). For example, in response to receiving a voice command, the system may detect that three devices corresponding to the user (e.g., on the user's network or currently logged into a user's online profile) are available. The system may then pull data from those devices. Alternatively, the system may pull supplemental data from all devices (e.g., without first filtering).

Whether or not filtering is first invoked, the system may analyze the supplemental data pulled from the one or more devices. If the system did not select the device to which the command related to based on an initial data pull, the system may analyze the supplemental data received from the one or more devices (or request more) to select the device, prior to determining a context of the command. For example, based on an image and/or other data included within an API request, the system may in addition to determine a context of the command also determine a device to which the command relates (e.g., prior to determining the context and/or customizing an API response). This determination may be based on current content of a device (e.g., a word that is included in the title of content being displayed on a device), functions associated with the device (e.g., a function ("record," "volume up," etc.) that is only available of one device), key words detected in the user command (e.g., a command naming the device), etc.

Figure 3:
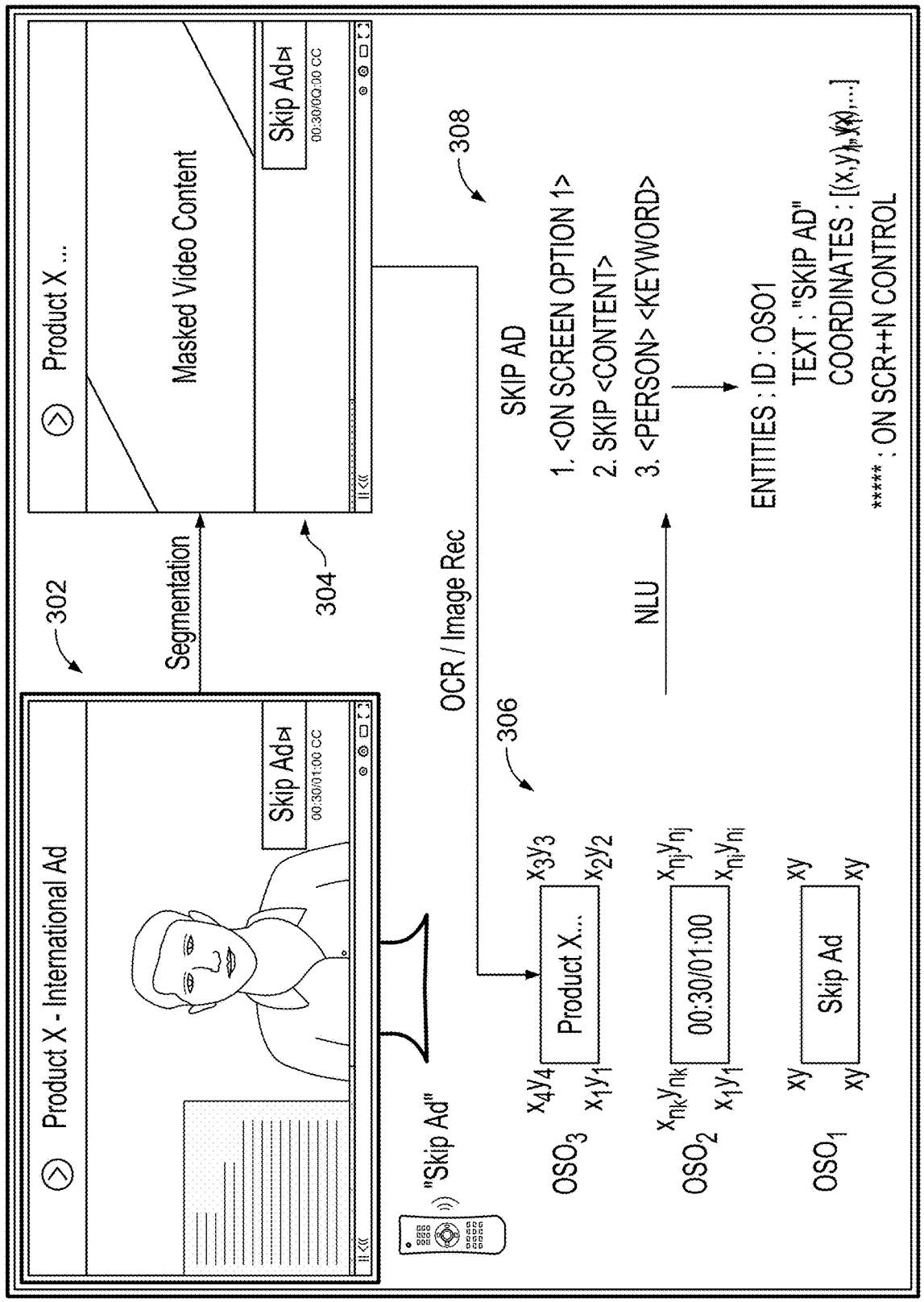
FIG. 3 shows another illustrative embodiment of determining a context of a user interface and supplementing an API request in accordance with some embodiments of the disclosure.

FIG. 3 shows another illustrative embodiment of determining a context of a user interface and supplementing an API request. In FIG. 3, a screen capture is performed every time the user presses the search button (voice or text) before screen 302 is changed to show either audio cues or a keyboard. The screen capture (or information derived from the screen capture) is then sent as part of an API request. The API that receives the request may then extract the user interface context from the screen capture and respond accordingly.

The amount and type of information that the API extracts may vary. For example, as shown in segmentation 304, the API may segment the screen capture of screen 302 into multiple objects by analyzing the screen capture and assigning boundaries to the detected objects. The API may use the screen capture to generate a vector or polygonal data structure based on each object. The data structure may include data defining interconnected vectors or polygons for further analysis. Alternatively, the original user interface or displayed image may include vectors or polygons such that when those vectors or polygons are rendered (e.g., by a graphics engine) the resulting rendering will represent the object or resemble the object with sufficient similarity as to be recognized by the API, without the API having to generate vectors or polygons from the image. In this manner the image file comprising the vectors and/or polygons for rendering by the graphics engine (or a simplified subset of the file), is sent to the API rather than a screen capture. As shown in FIG. 3, the API can apply an optical character recognition ("OCR") algorithm to detect different blocks of text, options, and/or functions.

As shown by metadata 306, the API can detect the order in which the results are displayed, on-screen options like "Skip Ad," names of the content that is playing, enabled settings, positions of content playback, etc. This information can serve as additional inputs (along with the received text or voice command) for a natural language processing or natural language understanding algorithm used to generate the API response.

For example, a search application using natural language understanding may account for the various detected objects when resolving ambiguities in the command. For example, the system may use information derived from the detected objects to weigh a potential response to the API request. For example, if the system is trying to select between a first response and a second response, the system may use on-screen listings that are closely associated with the first response (or the subject matter of the first response) to select the first response over the second response.

For example, as shown in FIG. 3, a user is watching a video on screen 302. Screen 302 is currently displaying a skippable advertisement. Additionally, screen 302 includes an option to "Skip Ad." Based on the current condition of the screen, the user may issue a voice command to "Skip Ad". In response to receiving a command, the system may send the command along with the screenshot of screen 302 in an API request. After performing an image analysis of the screenshot, the API may detect the "Skip Ad" option in the screenshot along with the coordinates of the option itself. It should be noted that in some embodiments, the image analysis may occur prior to sending the API request. That is, the device and/or application that received the command may analyze the screenshot and send the results of the analysis as supplemental information in the API request.

The API may then customize a response to the API request. For example, in response to determining that the voice command was "Skip Ad" when there is a "Skip Ad" function currently displayed, the API response may include instructions to select the "Skip Ad" action or otherwise trigger the on-screen icon (or its function). For example, the API response may include instructions to select the coordinates of the polygon the containing "Skip Ad" function.

The API may customize a response to the API request by adjusting its logic (e.g., modifying the route of a decision tree based on the inputs created by supplemental data in the API) as shown in logic 308. In such cases, the natural language understanding algorithm uses this supplemental data to provide an improved response to the user command. This improved response is then transmitted as an API response.

In another example, the API may determine that the API request is a command from a user to select an item using its position. For example, the API may determine that the current screenshot is of a list of available content. Using the screen capture, the API can not only detect each of the listed assets (e.g., via detecting titles, metadata, etc.), but it can also assign a ordinal position to each of the listings, to easily generate API responses to trigger actions for commands with a positional component such as "select the third one."

Figure 4:
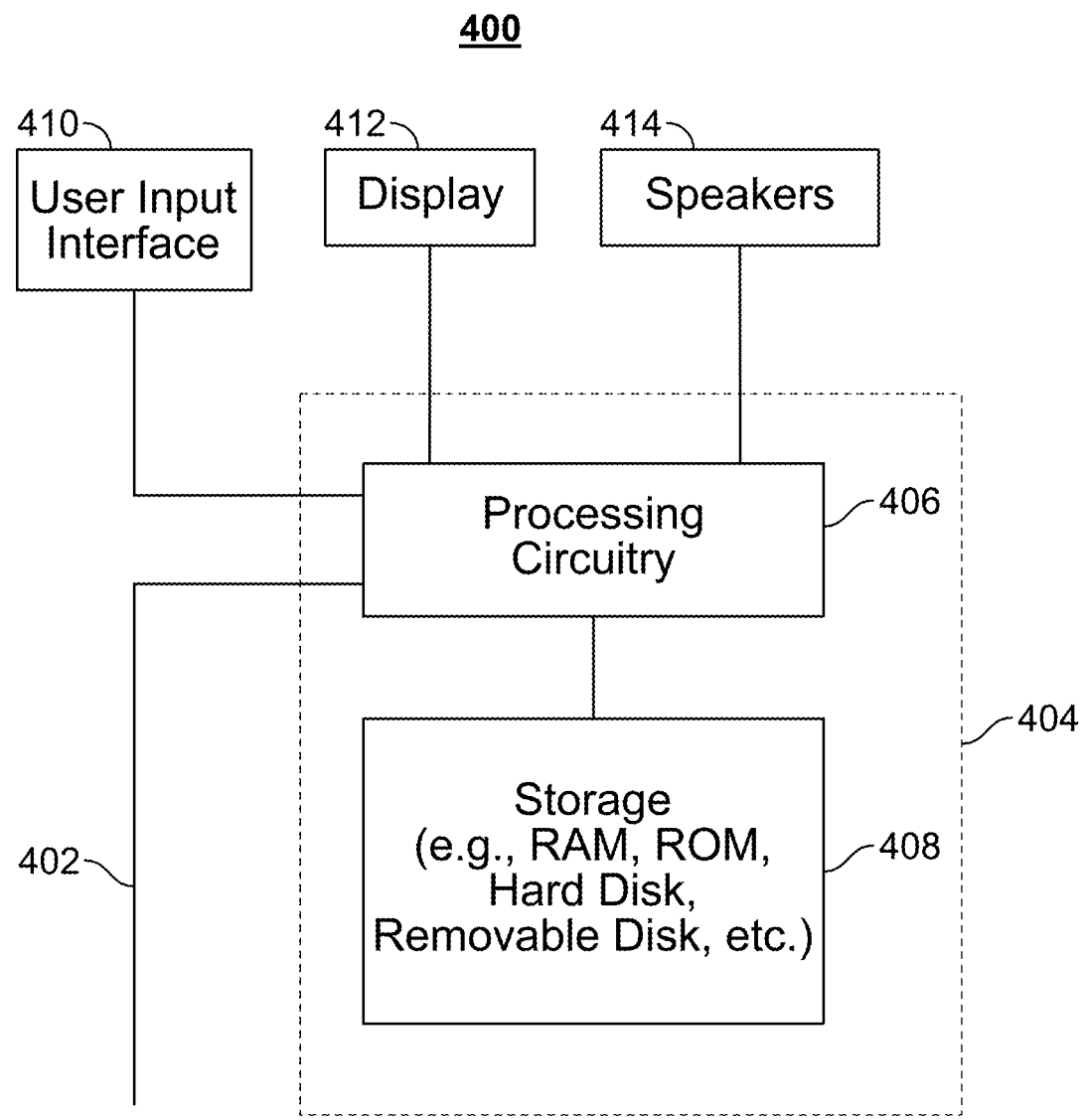
FIG. 4 is a block diagram of an illustrative user device in accordance with some embodiments of the disclosure.

FIG. 4 shows a generalized embodiment of illustrative user device 400, which may in some embodiments constitute a device capable of issuing an API request, responding to an API request, or both. It should also be noted that in some embodiments user device 400 may correspond to a server (either remote or local) and the API may form part of that server.

User device 400 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In client server-based embodiments, control circuitry 404 may include communications circuitry suitable for communicating with a server or other networks or servers.

Memory may be an electronic storage device provided as storage 408 that is part of control circuitry 404. As referred to herein, the phrase "electronic storage device" or "storage device" should be understood to mean any device for storing electronic data, computer software, or firmware, including cloud-based devices.

A user may send instructions to control circuitry 404 using user input interface 410. User input interface 410 may be any suitable user interface, such as a remote control, mouse, trackball, keypad, keyboard, touchscreen, touchpad, stylus input, joystick, voice recognition interface, or other user input interfaces.

In some embodiments, user input interface may be incorporated into user device 400 or may be incorporated into another device accessible by user device 400. For example, if user device 400 is a user optical device, surface space limitation may prevent user input interface from recognizing one or more input types. In such case, user input interface 410 may be implemented on a separate device that is accessible to control circuitry 404 (FIG. 4)).

Display 412 may be provided as a stand-alone device or integrated with other elements of user equipment device 400. For example, display 412 may be a touchscreen or touch-sensitive display.

Figure 5:
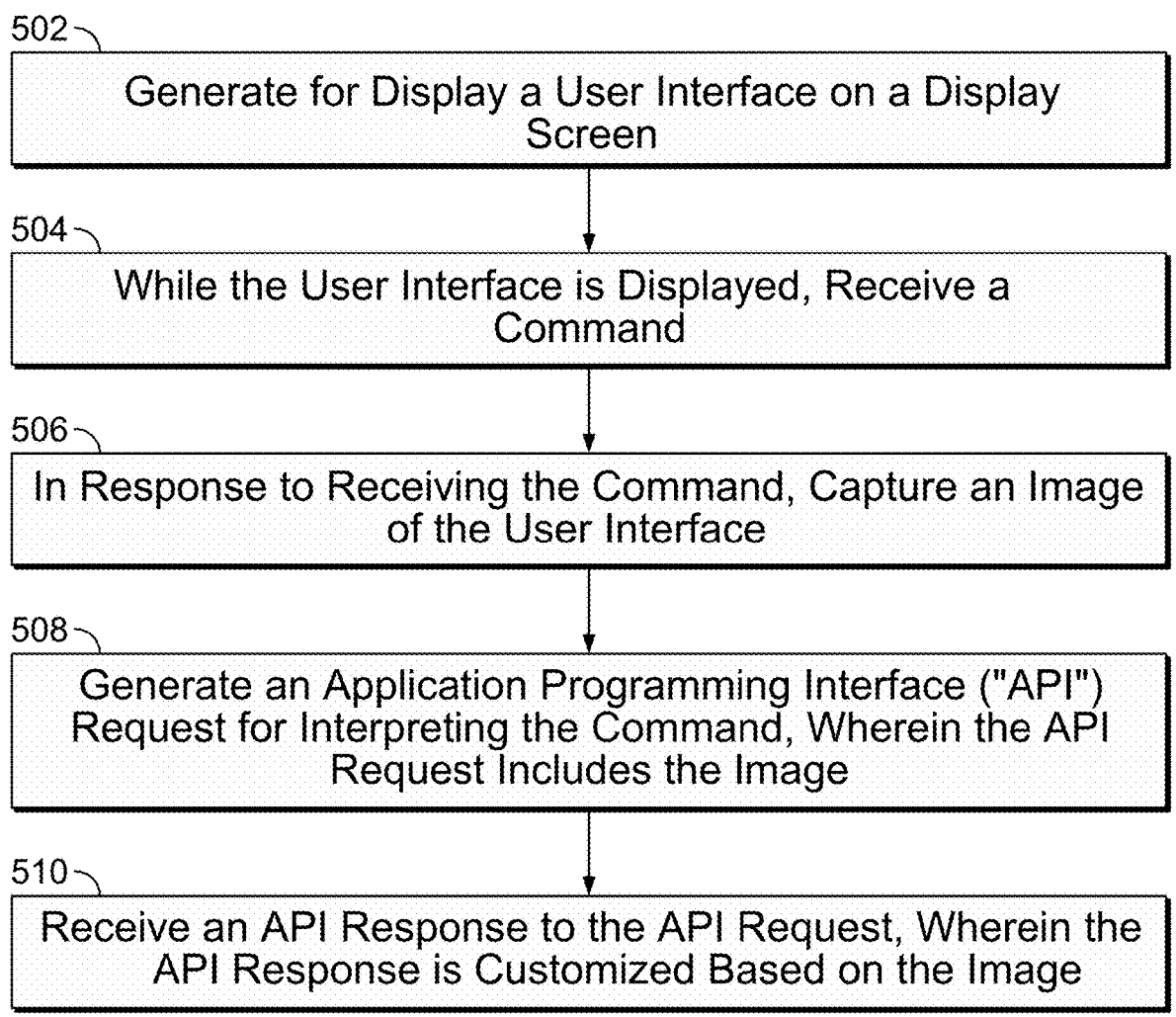
FIG. 5 is a flow chart of illustrative steps involved in facilitating communications using application programming interfaces by transmitting supplemented API requests in accordance with some embodiments of the disclosure.

FIG. 5 is a flow chart of illustrative steps involved in facilitating communications using application programming interfaces by transmitting supplemented API requests. It should be noted that process 500 or any step thereof could be displayed on, or provided by, one or more devices (e.g., device 400 (FIG. 4)). For example, process 500 may be executed using one or more of control circuitry 404 (FIG. 4), processing circuitry 406 (FIG. 4), or storage 408 (FIG. 4). In addition, one or more steps of process 500 may be incorporated into or combined with one or more steps of any other process (e.g., as described in FIGS. 6-8).

At step 502, process 500 generates for display (e.g., using control circuitry 404 (FIG. 4) a user interface (e.g., user interface 100 (FIG. 100)) on a display screen (e.g., display 412 (FIG. 4)). For example, while a user is viewing content on a computer screen or navigating a guide, the content and/or guide may appear on the computer screen.

At step 504, process 500 receives (e.g., using control circuitry 404 (FIG. 4)) a command while the user interface is displayed. For example, while the user is viewing content, the user may issue a voice command or enter a text string. The voice command or text string may relate to searching for additional content or relate to receiving additional information on content currently displayed on screen.

At step 506, process 500 captures (e.g., using control circuitry 404 (FIG. 4)) an image of the user interface in response to receiving the command. For example, the system may capture an image (e.g., a screenshot of the user interface), wherein the image is captured prior to modifying the user interface in response to the command.

At step 508, process 500 generates (e.g., using control circuitry 404 (FIG. 4)) an API request for interpreting the command, wherein the API request includes the image. For example, the API request may be structured similarly to the illustrative API request of FIG. 9.

At step 508, process 500 receives (e.g., using control circuitry 404 (FIG. 4)) an API response to the API request, wherein the API response is customized based on the image or vectorized data file. For example, the API request generated in step 508 may be transmitted to another device or application that generates an API response (e.g., as discussed below in FIG. 7). The API response may be customized (e.g., as described below in FIG. 8) based on the image (and/or the context of the user interface as described below in FIG. 8).

Figure 6:
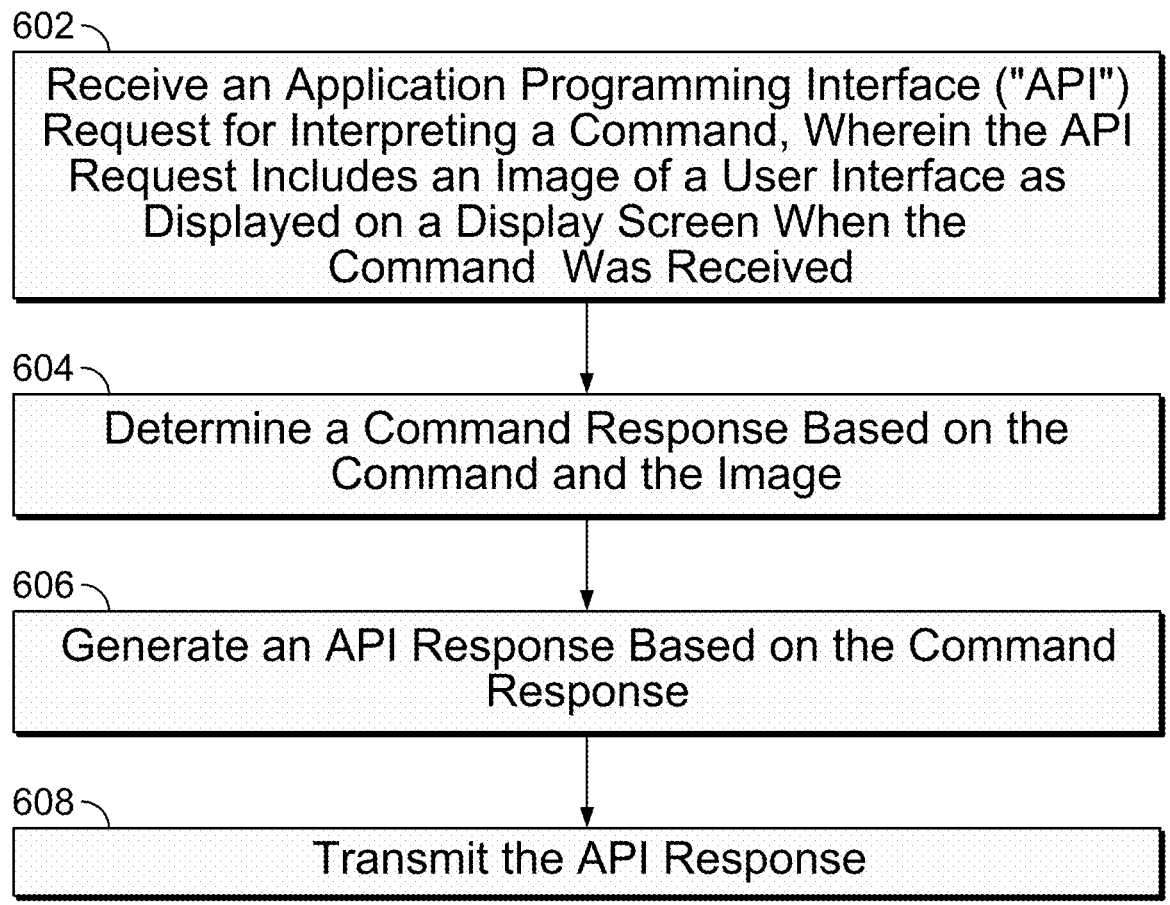
FIG. 6 is a flow chart of illustrative steps involved in facilitating communications using application programming interfaces by generating API responses based on supplemented API requests in accordance with some embodiments of the disclosure.

FIG. 6 is a flow chart of illustrative steps involved in facilitating communications using application programming interfaces by generating API responses based on supplemented API requests. It should be noted that process 600 or any step thereof, could be displayed on, or provided by, one or more devices (e.g., device 400 (FIG. 4)). For example, process 600 may be executed using one or more of control circuitry 404 (FIG. 4), processing circuitry 406 (FIG. 4), or storage 408 (FIG. 4). In addition, one or more steps of process 600 may be incorporated into or combined with one or more steps of any other process (e.g., as described in FIGS. 5, 7, and 8).

At step 602, process 600 receives (e.g., using control circuitry 404 (FIG. 4)) an API request for interpreting a command, wherein the API request includes an image of a user interface as displayed on a display screen when the command was received. For example, the system may receive an API request as shown in FIG. 9 below.

At step 604, process 600 determines (e.g., using control circuitry 404 (FIG. 4)) a command response based on the command and the image. For example, as discussed below in FIG. 7, the system may determine a response to the API request based on both the command received from the user as well as the supplemental content (e.g., an image) received with the API request.

At step 606, process 600 generates (e.g., using control circuitry 404 (FIG. 4)) an API response based on the command response. For example, after determining a command response at step 604, the system generates an API response. The API response may be generated in the same format of the API request as described in FIG. 9 below. For example, the API request and response may take any format (e.g., JSON or XML).

At step 608, process 600 transmits (e.g., using control circuitry 404 (FIG. 4)) the API response. The API response may be transmitted to a second device (e.g., the device that issued the API request) or a second application (e.g., the application that issued the API request).

Figure 7:
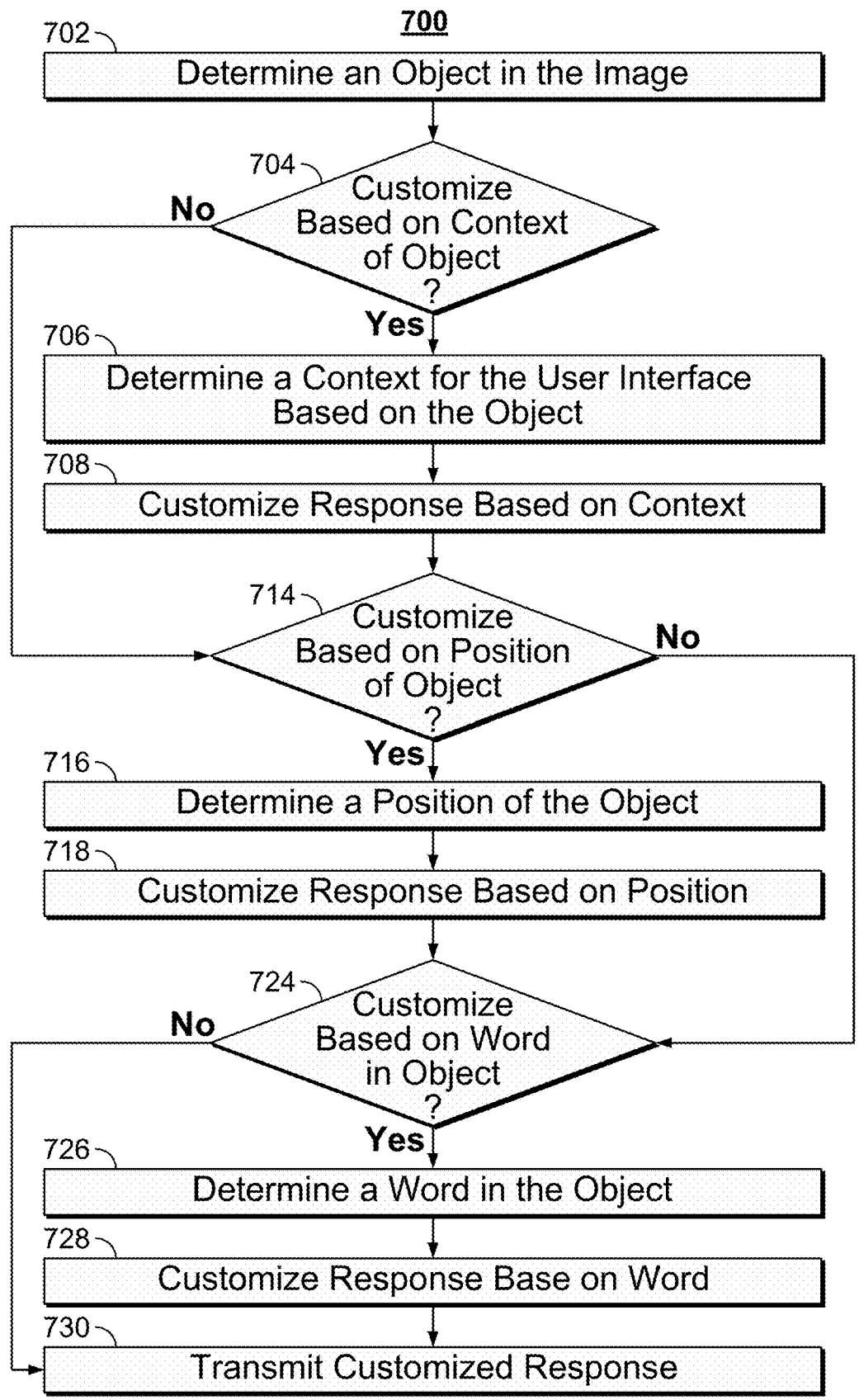
FIG. 7 is a flow chart of illustrative steps involved in customizing an API response in accordance with some embodiments of the disclosure.

FIG. 7 is a flow chart of illustrative steps involved in customizing an API response in accordance with some embodiments of the disclosure. It should be noted that process 700 or any step thereof could be displayed on, or provided by, one or more devices (e.g., device 400 (FIG. 4)). For example, process 700 may be executed using one or more of control circuitry 404 (FIG. 4), processing circuitry 406 (FIG. 4), or storage 408 (FIG. 4). In addition, one or more steps of process 700 may be incorporated into or combined with one or more steps of any other process (e.g., as described in FIGS. 5, 7, and 8).

At step 702, process 700 determines (e.g., using control circuitry 404 (FIG. 4)) an object in the image. The system may detect the object by metadata or other tags in content or through the use of machine learning approaches such as edge orientation histograms, scale-invariant feature transform descriptors, polygons, vectors, etc.

At step 704, process 700 determines (e.g., using control circuitry 404 (FIG. 4)) whether or not to customize the response to the API request based on the context of the object. This determination may be an automatic determination based on information in the API request or information supplementing the API request. For example, based on a file type of the information supplementing the API request, the system may determine what information to use to customize the response.

Alternatively or additionally, the system may look for instructions on what information to use to customize the response. Alternatively or additionally, the system may allow a user to manually determine or select presets for how API responses should be customized. If process 700 determines not to customize the response based on the context of the object, process 700 continues to step 714. If process 700 determines to customize the response based on the context of the object, process 700 continues to step 706.

At step 706, process 700 determines a context for the user interface based on the object. For example, the system may input the object into a lookup table database that lists the context of a given object (e.g., record 224 (FIG. 2)). The system may then receive an output of the context for that object.

At step 708, process 700 customizes the API response based on the context. For example, the system may generate the API response based on the context (i.e., the system may modify the API response to the command in the API request based on the context of an object found in an image of the user interface, display capture or rendering file).

At step 714, process 700 determines (e.g., using control circuitry 404 (FIG. 4)) whether or not to customize the response to the API request based on the context of the position of the object. This determination may be an automatic determination based on information in the API request or information supplementing the API request. For example, based on a file type of the information supplementing the API request, the system may determine what information to use to customize the response. Alternatively or additionally, the system may look for instructions on what information to use to customize the response. Alternatively or additionally, the system may allow a user to manually determine or select presets for how API responses should be customized. If process 700 determines not to customize the response based on the position of the object, process 700 continues to step 724. If process 700 determines to customize the response based on the position of the object, process 700 continues to step 716.

At step 716, process 700 determines a position of the object. For example, the system may input the object into a lookup table database that lists the position of a given object (e.g., record 124 (FIG. 1)). The system may then receive an output of the position for that object. Alternatively or additionally, the system may determine the position of the object as part of, or instead of, the detection of the boundaries of the object, as described below in FIG. 8. Alternatively or additionally, the system may determine the object itself from the vector or polygon information.

At step 718, process 700 customizes the API response based on the position. For example, the system may generate the API response based on the position (i.e., the system may modify the API response to the command in the API request based on the position of an object found in an image of the user interface).

At step 724, process 700 determines (e.g., using control circuitry 404 (FIG. 4)) whether or not to customize the response to the API request based on a word (or other text, alphanumeric character, etc.) of the object. This determination may be an automatic determination based on information in the API request or information supplementing the API request. For example, based on a file type of the information supplementing the API request, the system may determine what information to use to customize the response. Alternatively or additionally, the system may call or query for instructions on what information to use to customize the response. Alternatively or additionally, the system may allow a user to manually determine or select presets for how API responses should be customized. If process 700 determines not to customize the response based on a word corresponding to the object, process 700 continues to step 734. If process 700 determines to customize the response based on the context of the object, process 700 continues to step 726.

At step 726, process 700 determines a word in (or corresponding to) the object. For example, the system may input the object into a lookup table database that lists the OCR'ed content in a given object (e.g., record 224 (FIG. 2)). The system may then receive an output of the word for that object.

At step 728, process 700 customizes the API response based on the word. For example, the system may generate the API response based on the word (i.e., the system may modify the API response to the command in the API request based on the word corresponding to an object found in an image of the user interface).

At step 730, process 700 transmits the API based on the one or more customizations in steps 708, 718, or 728. It should be noted that in some embodiments, step 734 corresponds to step 608.

Figure 8:
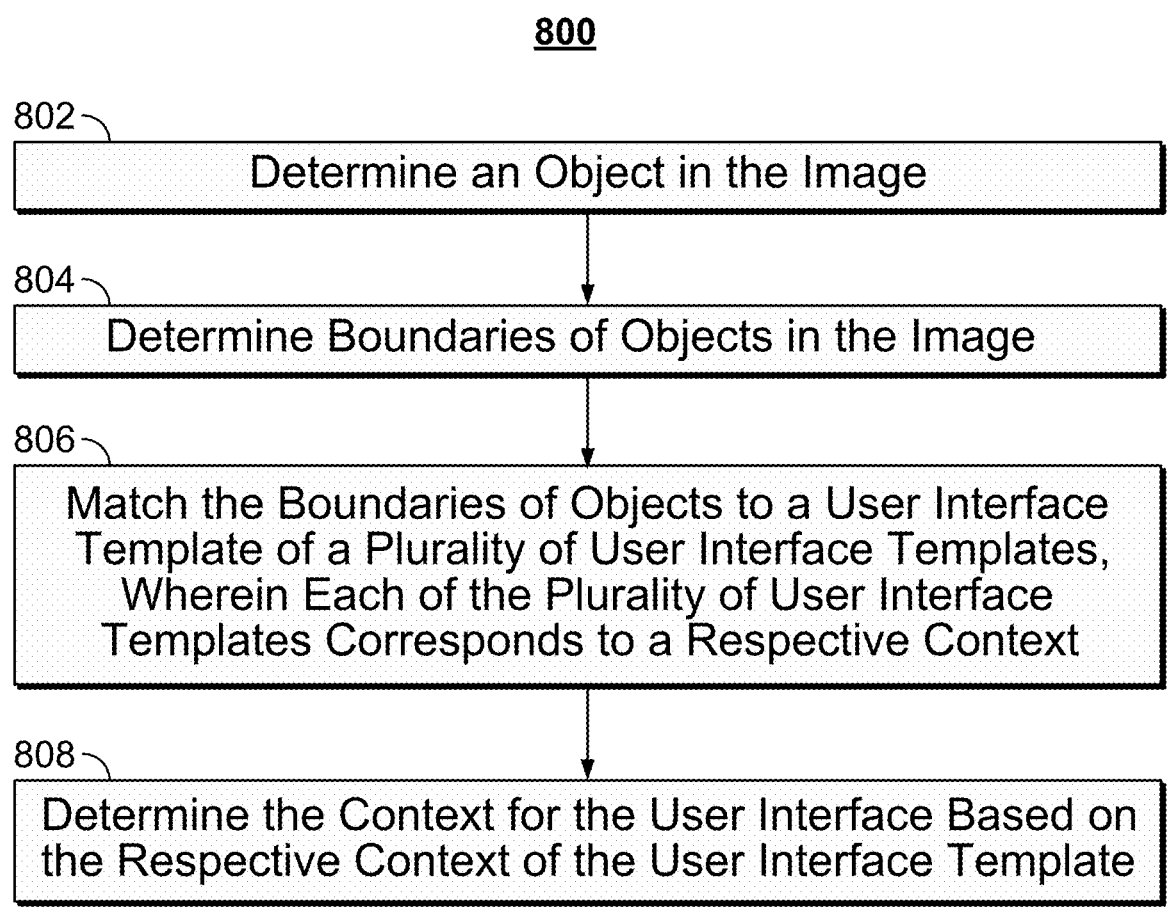
FIG. 8 is a flow chart of illustrative steps involved in determining the context of a user interface in accordance with some embodiments of the disclosure.

FIG. 8 is a flow chart of illustrative steps involved in determining the context of a user interface. It should be noted that process 800 or any step thereof could be displayed on, or provided by, one or more devices (e.g., device 400 (FIG. 4)). For example, process 800 may be executed using one or more of control circuitry 404 (FIG. 4), processing circuitry 406 (FIG. 4), or storage 408 (FIG. 4). In addition, one or more steps of process 800 may be incorporated into or combined with one or more steps of any other process (e.g., as described in FIGS. 5-7).

At step 802, process 800 determines (e.g., using control circuitry 404 (FIG. 4)) an object in the image. The system may detect the object by metadata or other tags in content or may be detected through the use of machine learning approaches such as edge orientation histograms, scale-invariant feature transform descriptors, vectors, polygons, etc.

At step 804, process 800 determines (e.g., using control circuitry 404 (FIG. 4)) boundaries of objects in the image or the objects themselves. For example, the system may identify points in the image at which the image brightness changes sharply or has discontinuities (edge detection) and/or partition the image into multiple segments or sets of pixels (texture segmentation). It should be noted that in some embodiments, the detection of the object in step 802 may include the determination of the boundaries at step 804. In such case, the system stores the boundaries of the object for use in template matching in step 806.

At step 806, process 800 matches (e.g., using control circuitry 404 (FIG. 4)) the boundaries of objects to a user interface template of a plurality of user interface templates, wherein each of the plurality of user interface templates corresponds to a respective context. For example, the system may input the template into a lookup table database that lists the context of a given template. The system may then receive an output of the context that matches the inputted template.

At step 808, process 800 determines (e.g., using control circuitry 404 (FIG. 4)) the context for the user interface based on the respective context for the user interface template. The system may then customize the determined API response based on the context. For example, the context may be used to determine the circumstances of the command in terms of which it can be fully understood and assessed by the system. For example, if the context relates to a list of movies, the system may account for that context when determining the response.

FIG. 9 is an illustrative example of a supplemented API request in accordance with some embodiments of the disclosure. API request 900 includes URL 902, body 904, body 906, and method 908. API request 900 may correspond to one half of the API request-response cycle between one or more devices and/or applications. For example, communication in HTTP (Hyper Text Transfer Protocol) centers around the request-response cycle. To make a valid request, the client (e.g., a first device and/or application) should include a URL (Uniform Resource Locator), method, list of headers, and/or body.

URL 902 allows the client to inform the server (e.g., a second device and/or application) what resources to use. For example, URL 902 directs the server to the "VoiceRecognitionApplication."

API request 900 also includes body 904 and body 906, which contain headers and data. The headers (e.g., "Content-Type") provide metadata about the request. For example, the header information may be used to determine what information should be used to customize a response (e.g., as described in FIG. 7). Body 904 and body 906 also include data (i.e., files). For example, body 904 corresponds to an image (e.g., a screenshot of a user interface), while body 906 corresponds to an audio track (e.g., a recording of a voice command issued by a user).

Method 908 informs the server of the action the client wants the server to take. Method 908 indicates a "POST" request asking the server to create a new resource. Other illustrative requests include "GET," "PUT," and "DELETE," requests.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for facilitating communications using application programming interfaces ("APIs"), the method comprising:

receiving, from a device, via a network, by control circuitry of a server, an application programming interface ("API") request for interpreting a command, wherein the API request includes an image of a user interface as displayed on a display screen of the device when the command was received, wherein the server is remote from the device;

caching, by the control circuitry, at the server, the image in the API request;

determining, by the control circuitry of the server, a command response based on the command and the image;

generating, by the server, an API response based on the command response; and transmitting, from the server, via the network, the API response to the device.

2. The method of claim 1, wherein determining the command response based on the command and the image further comprises:

determining an object in the image;

determining a context for the user interface based on the object; and customizing the command response based on the context.

3. The method of claim 2, wherein the object in the image is determined by:

determining boundaries of objects in the image;

matching the boundaries of objects to a user interface template of a plurality of user interface templates, wherein each of the plurality of user interface templates corresponds to a respective context; and determining the context for the user interface based on the respective context for the user interface template.

4. The method of claim 1, wherein determining the command response based on the command and the image further comprises:

determining an object in the image;

determining a position of the object in the user interface; and customizing the command response based on the position.

5. The method of claim 1, wherein determining the command response based on the command and the image further comprises:

determining an object in the image;

determining a word corresponding to the object in the user interface; and customizing the command response based on the word.

6. The method of claim 1, wherein determining the command response based on the command and the image comprises interpreting the command based on an object in the image.

7. The method of claim 1, wherein the command is a vocal search command, and the API request is for a voice recognition application.

8. The method of claim 1, further comprising transmitting, by the control circuitry, the API request from a first device to a second device.

9. The method of claim 1 wherein the API response is customized based on the image.

10. The method of claim 1, wherein the image is captured prior to modifying the user interface in response to the command.

11. A system for facilitating communications using application programming interfaces ("APIs"), the system comprising:

control circuitry configured to:

receive, from a device, via a network, at a server, an application programming interface ("API") request for interpreting a command, wherein the API request includes an image of a user interface as displayed on a display screen of the device when the command was received, wherein the server is remote from the device;

cache, at the server, the image in the API request;

determine, at the server, a command response based on the command and the image; and generate, at the server, an API response based on the command response; and output circuitry configured to transmit the API response from the server via the network to the device.

12. The system of claim 11, wherein the control circuitry is further configured to:

determine an object in the image;

determine a context for the user interface based on the object; and customize the command response based on the context.

13. The system of claim 12, wherein the control circuitry is further configured to:

determine boundaries of objects in the image;

match the boundaries of objects to a user interface template of a plurality of user interface templates, wherein each of the plurality of user interface templates corresponds to a respective context; and determine the context for the user interface based on the respective context for the user interface template.

14. The system of claim 11, wherein the control circuitry is further configured to:

determine an object in the image;

determine a position of the object in the user interface; and customize the command response based on the position.

15. The system of claim 11, wherein the control circuitry is further configured to:

determine an object in the image;

determine a word corresponding to the object in the user interface; and customize the command response based on the word.

16. The system of claim 11, wherein determining the command response based on the command and the image comprises interpreting the command based on an object in the image.

17. The system of claim 11, wherein the command is a vocal search command, and the API request is for a voice recognition application.

18. The system of claim 11, wherein the API request is received, by a second device, from a first device.

19. The system of claim 11 wherein the API response is customized based on the image.

20. The system of claim 11, wherein the image is captured prior to modifying the user interface in response to the command.

* * * * *